No. 856,756. PATENTED JUNE 11, 1907.
C. H. AVEY.
FEED RECEPTACLE OR BAG.
APPLICATION FILED JAN. 13, 1906.

WITNESSES:
William H. Lewis
James W. Mays

INVENTOR.
Charles Houghton Avey,
BY
Cassell Severance
ATTORNEY.

UNITED STATES PATENT OFFICE.

CHARLES HOUGHTON AVEY, OF SAN FRANCISCO, CALIFORNIA.

FEED RECEPTACLE OR BAG.

No. 856,756.   Specification of Letters Patent.   Patented June 11, 1907.

Application filed January 13, 1906. Serial No. 295,977.

*To all whom it may concern:*

Be it known that I, CHARLES HOUGHTON AVEY, a citizen of the United States, residing at San Francisco, in the county of San Francisco and State of California, have invented new and useful Improvements in Feed Receptacles or Bags, of which the following is a specification.

This invention relates to improvements in feed receptacles or bags, and more particularly to that class of receptacles that are adapted to be suspended upon the head of an animal when in use.

It is the object of the invention, among other things, to provide a feed receptacle or bag for horses or other animals which shall be thoroughly ventilated so that the stifling effect usually due to the use of such bags may be avoided and the animal be given ample chance to breathe fully without stirring up or drawing the dust of grain or other foods into his nostrils.

With this and other objects in view, the invention comprises certain novel constructions, combinations, and arrangements of parts as will be hereinafter fully described and claimed.

Figure 1:
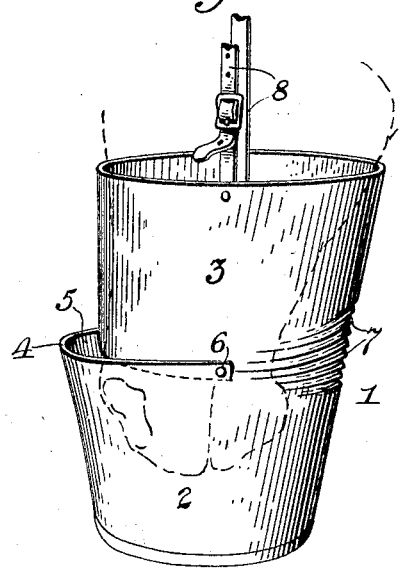
Figure 2:
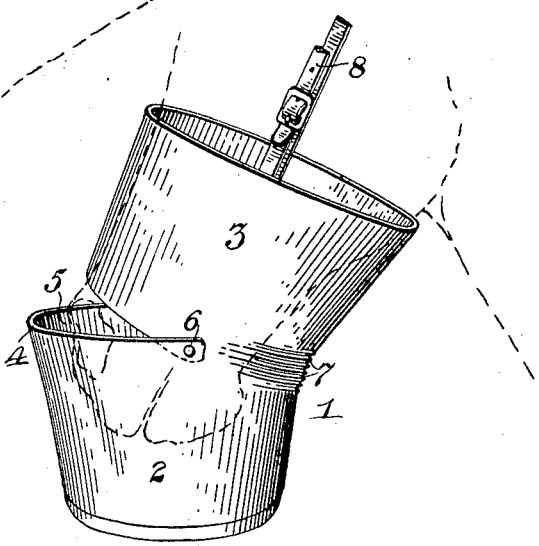
Figure 3:
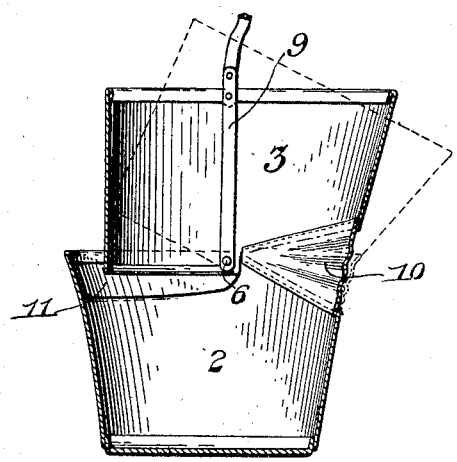
Figure 4:
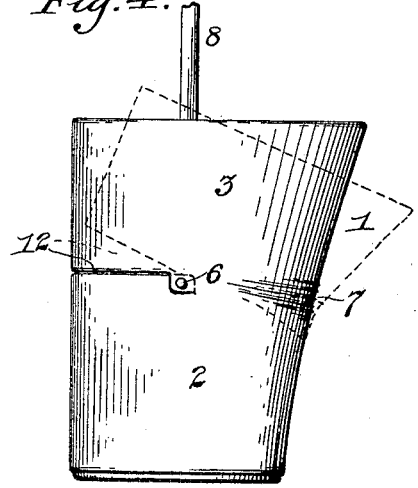

In the accompanying drawing:—Figure 1 is a perspective view of the improved feed receptacle or bag, forming the subject matter of the present invention, the bag being shown as suspended from a horse's head, when his head is lowered and the parts of the bag assume a vertical alinement. Fig. 2 is a perspective view of the receptacle or bag but showing the parts in the positions they assume when the horse or other animal raises his head as in chewing his food. Fig. 3 is a central vertical sectional view taken through the bag, the parts being in their normal vertical position, the tipped position of the upper portion being indicated in dotted lines. Fig. 4 is a side elevation of a modified form of the receptacle or bag in which the front wall of the lower part is substantially in alinement with the front wall of the upper part.

The present invention is designed for the production of a feed receptacle or bag for horses or other animals which, while capable of holding a suitable quantity of feed to the mouth of the animal, is so constructed that an ample inlet for fresh air is afforded at a point adjacent to the nostrils of the animal. In the drawing I have illustrated the preferable construction of such a feed receptacle or bag and I will now describe the invention, reference being had to said illustration.

In the drawing, 1, indicates a feed bag having a lower feed containing portion 2 and an upper attaching or suspending portion 3. The walls of the upper and lower portions are preferably made continuous from top to bottom, at the rear; but at the front the wall of the lower portion 2 is somewhat enlarged so that it will extend outwardly beyond the front wall of the upper portion 3 as shown at 4, so that an air inlet opening of suitable size is provided as at 5. I usually form the front wall of the upper portion 3 so as to extend within the upper front edge 4 of the lower portion 2, a sufficient distance to prevent the accidental escape of feed from the receptacle or bag through the said opening 5. It will be apparent that the said front wall of the upper portion may be projected any desired distance into the lower portion 2 and below the upper edge 4 of said lower portion to insure the proper retention of the feed within the bag.

In forming the air inlet opening 5 the upper and lower portions of the bag are preferably divided about half way around the bag as clearly shown in the drawing and at the points where the divided portions of the bag come together, upon opposite sides thereof, I usually secure the parts by a rivet, pin, eyelet or other suitable fastening 6 so that a pivotal action is secured in the separation of the front edges of the bag when the animal lifts his head. To further facilitate this pivotal action of the parts, the rear wall of the bag is usually crimped, folded, creased or otherwise rendered flexible as indicated at 7. This permits of a contraction of the central portion of the rear wall when the horse's head is raised as illustrated in Fig. 2.

Any usual or desired form of suspending or attaching straps as 8 may be fastened to the upper attaching portion of the receptacle or bag as shown in the drawings. The position of a horse's head in the bag is indicated in Figs. 1 and 2 by dotted lines and the attaching straps pass upwardly over the head to hold the receptacle or bag in position.

The bag is preferably constructed of duck, canvas or other similar material and the upper attaching portions 3 may, if desired, be stiffened or reinforced at the sides by securing to each side a bar or metallic strap as 9 clearly shown in Fig. 3. When using such a stiffening bar, the rivet or pivot pin 6 is passed through the lower end of the strap or bar 9. Such stiffening bars hold the parts more firmly in position for the proper swinging or rocking of the lower portion of the bag in accommodating itself to the various positions of the animal's head.

In constructing my improved feed bag the upper attaching portion 3, may be severed from the lower feed holding portion at the rear as well as at the front, and, when so forming the bag, a flexible gusset 10 is provided and joined to the adjacent edges of the lower and upper portions 2 and 3 as shown in Fig. 3 of the drawing. The effect is the same as when the rear wall is made of a continuous piece and crimped or folded at the central portion as shown in Figs. 1 and 2.

If the material of which the receptacle or bag is constructed is not sufficiently stiff to maintain the meeting edges at the opening 5 in proper shape with respect to each other, the said material may be stiffened by the use of material such as leather, wire or metal bands and securing such material adjacent to the edges at said opening 5. As shown in Fig. 3, I contemplate inserting a curved piece of stiffening material 11 upon the inner surface of the lower portion 2. Said stiffening piece 11 preferably extends from the front around the sides to the pivot pins 6. In this simple manner, the edge 4 of the lower portion 2 is always made to stand out in such a shape that the edge of the upper portion 3 can readily enter said lower portion.

In Fig. 4, I have shown a feed receptacle or bag in which an opening 12 is formed in the front wall, which opening is capable of being spread when the upper part of the bag is bent backwardly as indicated by the dotted lines. In this form of bag the front walls of the upper and lower portions of the bag are substantially in alinement and for this reason the opening in the side of the bag is momentarily closed when the animal lowers his head to obtain food. Of course as soon as the head is raised again the front of the bag will open for admitting air to the nostrils of the animal. While this form of bag is entirely within the scope and spirit of the present invention, I preferably form the bag as shown in Figs. 1, 2 and 3 of the drawing in which a ventilating opening is always maintained opposite the nose of the animal.

The bag or feed receptacle like that above described is found in use to possess advantages over the common undivided bag, particularly when considering the same from a humane standpoint. In the ordinary bag, and even one in which perforations or screens are placed in the walls of the bag, the animal is forced to breathe air which is ladened with dust and particles of feed which are necessarily blown about by the breathing of the animal. By using my improved bag, a large opening for the introduction of fresh pure air is always maintained immediately opposite the nose of the animal and this opening is considerably increased when the horse or the animal holds his head in its raised natural condition in chewing its food.

Of course I consider that any minor changes in the details of the construction of the bag, or changes in the material of which it is made, are within the spirit and scope of the invention.

It will be observed that the front wall of the upper portion 3, engages the nose of the animal in such a manner that the nose is prevented from engaging the front wall of the lower portion 2, and is thus also so spaced therefrom as to prevent the cutting off of the air supply. It will be evident that the band formed by the upper wall portion 3, may be made broad or narrow or of any desired width, without departing from the spirit of the invention or affecting its function of limiting the position of the animal's nose with respect to the lower front wall of the bag and the air inlet opening.

Having now described my invention, what I claim as new and desire to secure by Letters Patent is:—

1. A feed receptacle or bag, having an air inlet capable of expansion upon tipping a portion of the bag.

2. A feed bag or receptacle having a transverse ventilating opening capable of expansion and contraction upon the bending of the bag or receptacle.

3. A feed receptacle or bag comprising a feed holding portion, an attaching portion and means connecting said portions, an expansible opening being formed between the portions to ventilate the said receptacle or bag.

4. A feed receptacle or bag comprising upper and lower portions separated for a portion of their circumference, to afford an expansible air inlet and pivotal means connecting the said portions.

5. A ventilated feed receptacle or bag comprising inclosing walls and a bottom, the said inclosing walls divided for a portion of the distance around the bag, forming upper and lower bag portions and a flexible portion arranged in the undivided part of the said walls, facilitating the tipping of the upper portion of the bag and the spreading of the opening between the divided parts of the walls.

6. A ventilated feed receptacle or bag comprising a lower feed holding portion, an upper attaching portion, rivets for securing the said portions opposite the central portion of the bag, and flexible means arranged opposite the rivets upon one side of the bag to facilitate its folding, the said bag being divided upon the opposite side of the rivets from said flexible portion, the dividing of the bag providing an expansible opening for the introduction of air.

7. A feed receptacle or bag comprising a lower feed holding portion, an upper attaching portion, the said lower portion projecting beyond the upper portion upon one side of the bag for forming an air inlet, and means connecting the two portions of the bag for permitting them to rock with respect to each other.

8. A feed receptacle or bag comprising an upper animal engaging portion, a lower feed carrying portion, pivotally mounted upon the said upper portion, an opening being left between the said portions upon one side of the bag and a flexible piece of material connecting the said portions upon the other side of the bag, the rocking of the upper portion of the bag causing the spreading of the opening in the side thereof.

9. A feed receptacle or bag having an upper supporting portion, a lower swinging portion, means connecting the two portions and permitting the swinging of the lower portion under the weight of itself and contents, stiffening bars extending longitudinally of the upper supporting portion and means for connecting the lower portion to the said stiffening bars and the said upper portion, an expansible opening being left between the said portions part way around the bag.

10. A feed receptacle or bag formed with an upper suspending portion, a lower feed carrying portion secured thereto, part way around the bag and divided therefrom the remainder of the distance around the bag, an outwardly projecting part being formed on the lower portion opposite said divided part and a downwardly projected edge formed on the upper portion and extending into the outwardly projecting part of the lower portion, an expansible opening being secured between the parts at this point.

11. A feed receptacle or bag comprising an upper and a lower portion means for movably connecting the two portions, the said portions being separated upon one side of the bag, the lower edge of the upper portion extending into the upper edge of the lower portion, and means permitting of the spreading of the said opening when the animal using the bag raises his head.

12. A feed receptacle having a horizontal vent opening capable of expansion upon the tipping of the upper portion of the receptacle.

13. A feed receptacle provided with a ventilating opening and having a lower feed portion and an upper supporting band, capable of movement with respect to the lower portion to increase the size of the ventilating opening, the band preventing the closing of the opening by an animal's nose.

14. A feed receptacle having an air inlet capable of expansion for ventilating the bag or receptacle and a nose limiting band above the expansible opening.

In testimony whereof I affix my signature, in presence of two subscribing witnesses.

CHARLES HOUGHTON AVEY.

Witnesses:
WILLIAM H. LEWIS,
JAMES W. MAYS.